Sept. 1, 1931.  J. PRICCO  1,821,403
CLAMP AND ARM FOR ROCK DRILLS AND THE LIKE
Filed Aug. 8, 1928   2 Sheets-Sheet 1
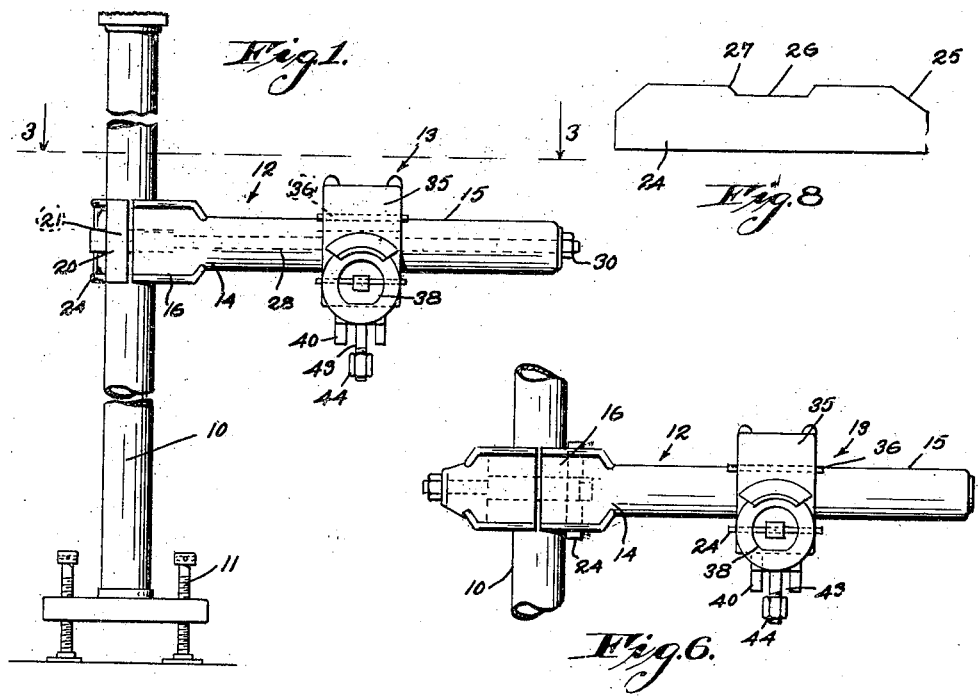
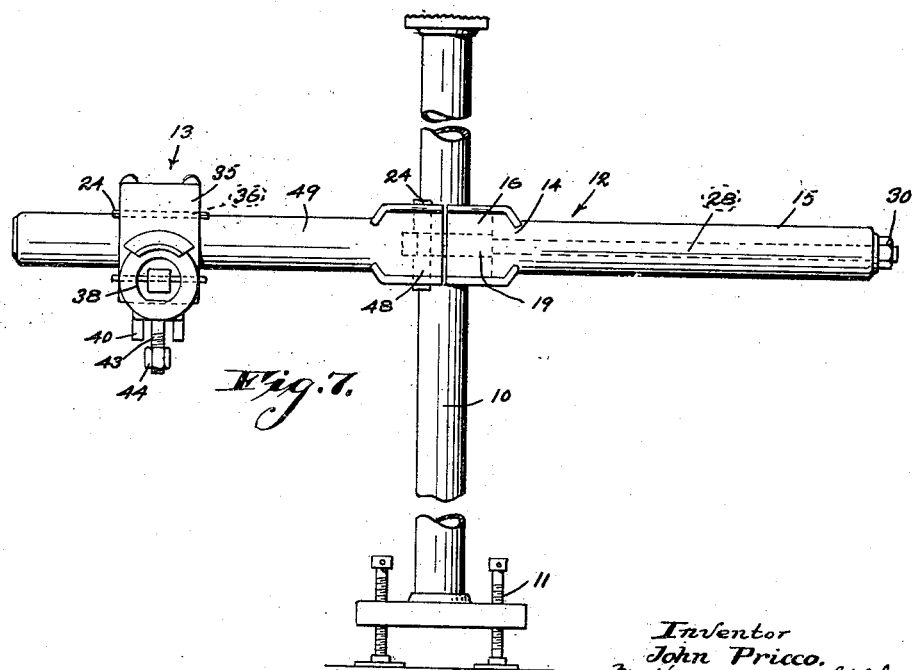
Inventor
John Pricco.
By Hazard and Miller
Attorneys Sept. 1, 1931.  J. PRICCO  1,821,403
CLAMP AND ARM FOR ROCK DRILLS AND THE LIKE
Filed Aug. 8, 1928   2 Sheets-Sheet 2
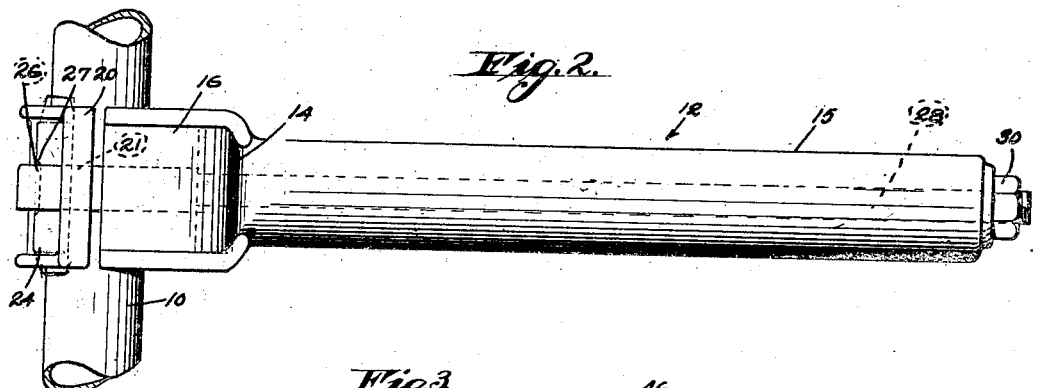
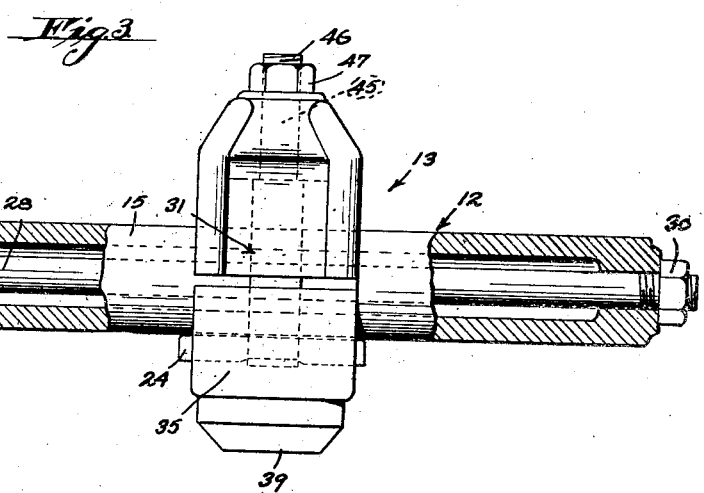
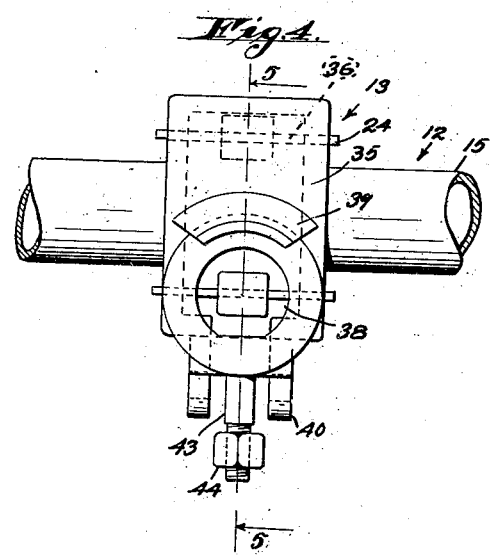 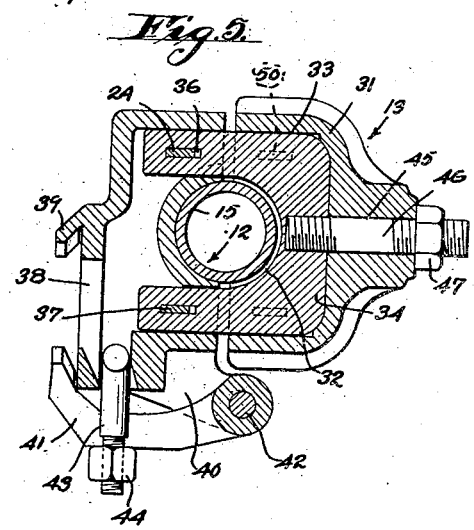
Inventor
John Pricco,
by Hazard and Miller
Attorney Patented Sept. 1, 1931

1,821,403

UNITED STATES PATENT OFFICE

JOHN PRICCO, OF LOS ANGELES, CALIFORNIA, ASSIGNOR OF ONE-HALF TO WALTER SMITH, OF LOS ANGELES, CALIFORNIA

CLAMP AND ARM FOR ROCK DRILLS AND THE LIKE

Application filed August 8, 1928. Serial No. 298,150.

This invention relates to improvements in devices for drilling machines and the like such as are employed in mining operations.

An object of the invention is to provide an improved support for drilling machines and the like which is so constructed that it can be easily and quickly adjusted to support the machine in the desired position and at the same time will provide a rigid support. Supports of this type which are now in general use provide for various adjustments but in adjusting the construction it is necessary to loosen and subsequently tighten quite a number of bolts or nuts. It may be considered as another object of the invention to provide a construction having a supporting column and adjustable supporting arm thereon and an adjustable clamp on the arm which is so constructed that the arm and clamp can both be adjusted on loosening and subsequently tightening a single nut on each part.

Another object of the invention is to provide an adjustable supporting structure for drilling machines and the like which is so constructed that parts are interchangeable and may be assembled together in various manners to produce various forms of supporting structures as may be desired.

Another object of the invention is to provide a supporting structure for drilling machines and the like wherein there is a supporting column, a supporting arm adjustable thereon and a clamp adjustable on the arm which is so constructed that parts of the clamp are interchangeable with parts forming the arm. In this manner parts of the clamp may be used in forming various supporting structures and it is not necessary to have available an unusually large number of parts in forming the various structures.

With the foregoing and other objects in view which will be made manifest in the following detailed description and specifically pointed out in the appended claims reference is had to the accompanying drawings for an illustrative embodiment of the invention, wherein;

Fig. 1 is a view in side elevation of the improved drilling machine supporting structure in the form in which it is most generally employed.

Fig. 2 is a partial view in side elevation of the supporting arm, the clamp reversible thereon being shown as having been removed.

Fig. 3 is a horizontal section taken substantially upon the line 3—3 upon Fig. 1, some of the parts which would otherwise appear in elevation therein being shown as having been broken away and shown in section.

Fig. 4 is a partial view of the supporting arm showing the clamp thereon in front elevation.

Fig. 5 is a view in vertical section taken substantially upon the line 5—5 upon Fig. 4.

Fig. 6 is a partial view in front elevation illustrating the parts as having been assembled to form a slightly modified supporting structure.

Fig. 7 is a view in front elevation illustrating the parts as having been assembled to form another form of supporting structure for a drilling machine or the like.

Fig. 8 is a view in side elevation of one of the pins employed in assembling the parts of the device.

Referring to the accompanying drawings wherein similar reference characters designate similar parts throughout, the supporting structure consists of a vertical cylindrical column 10 such as is generally employed in mines for supporting drilling machines. This column is provided at its base with adjusting means 11 which is conventional and which need not be specifically described. On the column there is provided a supporting arm generally designated at 12 on which there is a clamp generally designated at 13 which provides a socket for receiving a part conventionally formed on drilling machines and the like.

The details of construction of the arm 12 are as follows: The arm consists of a body part 14 having a long hollow tubular extension 15. The inner end of the body part 14 is widened as indicated at 16 to form a head in which is formed a rectangular recess 17. The top and bottom of the head are recessed with semi-circular recesses 18 so that the head may fit snugly against the column 10.

Within the recess 17 there is disposed a U-shaped yoke 19 which partially encircles the column 10 and which has its arms projecting from the recess 17 to receive a cap part 20. The cap part 20 has apertures formed therein indicated at 21 to receive the arms on the yoke and has a semi-circular surface 22 to fit against the opposite side of the column 10 from the head 14. Rectangular apertures 23 are formed in the arms of the yoke 19 to receive pins 24 which fasten the yoke and cap part together. The pins 24, as clearly shown in Fig. 8 have their ends beveled off as indicated at 25 to facilitate their insertion into the apertures 23. One edge of each pin 24 is slightly recessed as indicated at 26, the recess having outwardly flaring sides 27. When the pins are in position in the apertures 23 the back of the recess 26 is facing the outer end of the arm on the yoke 19 and part of the outer end of the arm on the yoke enters the recess 26 to prevent the pins from dropping out of the apertures 23. By virtue of the fact that the sides of the recess 26 are outwardly flared it is possible to knock the pins out of the apertures 23 in disassembling.

A long rod 28 constituting a tension member is disposed within the tubular portion 15 on the arm and has its inner end threaded into the back of the yoke 19 as indicated at 29. The outer end of the rod 28 extends outwardly a short distance beyond the end of the arm and is threaded to receive a nut 30.

In adjusting the height of the arm 12 on the column 10 the nut 30 is loosened, which loosens the yoke 19 permitting the arm 12 to be raised, lowered or turned on the column 10. When in adjusted position the nut 30 is tightened placing the rod 28 under tension and drawing the yoke 19 away from the column 10, causing the cap part 20 and the head 14 on the arm to clampingly engage the column 10. It will thus be understood that the arm 12 is tightened in adjusted position by tightening the nut 30 alone so that there is but a single nut to be loosened and tightened in adjusting the arm.

On the tubular portion 15 of the arm 12 there is a clamp 13. This clamp consists of a body part 31 which is identically the same in construction as the construction of the head 14. Its sides are recessed as indicated at 32 to fit against the tubular portion 15. Between the sides there is a rectangular recess 33 which receives the yoke 34 which is identical in construction to the yoke 19. A cap part 35 is provided which receives the projecting arms on the yoke 34 and has apertures in its sides adapted to be caused to register with the apertures 36, formed in the arms of the yoke 34 to receive pins 37. The cap part 35 has a circular opening 38 formed therein over which there is an arcuate lip. It is provided with ears 40 on which a latch or dog 41 is pivoted by means of a pivot pin 42. This dog is held in position by means of a T-bolt 43 on which there is a tightening nut 44. In this manner the cap 35 provides a socket permitting a part on a drilling machine or the like to be inserted into the aperture 38. A part of the arm on the drilling machine enters beneath the lip 39 and another part is adapted to be engaged by the dog or latch 41 so that when the nut 44 is tightened the machine will be firmly held on the cap part 35. In the back of the body part 31 there is formed a central bore 45 which receives a short rod or stud 46 which is threaded into the back of the yoke 35. This short rod constitutes a tension member adapted to have tension applied thereto by the nut 47. When tension is applied to the rod 46 it draws the yoke 34 away from the tubular portion 15 on the arm causing the body part 31 and the cap part 35 to clampingly engage on the tubular portion 15. It will be understood from the description of the clamp that the clamp can be loosened, adjusted and tightened on loosening and tightening the nut 47 alone.

By virtue of the above described construction it is possible to interchange parts on the clamp with parts on the arm. Furthermore it is possible to build various supporting structures for the drilling machine. As the tubular portion 15 is of the same diameter as the column 10 it is possible to assemble the clamp 13 directly on the column so as to mount a machine directly on the column.

In some instances where it is desirable to employ the arm 12 it is difficult to get at the outer end of the arm to tighten or loosen the nut 30. When such is the case the parts are assembled as shown in Fig. 6. The body part of the supporting arm 12 is employed and the yoke 19, the rod 28 and the nut 30 are removed. A clamp body part 31 together with its yoke 34 and tension member 46 is then positioned on the opposite side of the column 10 from the arm body part as shown in Fig. 6 taking the place of the arm cap part 20. In such position the arms on the yoke 34 extend into the recess 17. Apertures 48 are formed in the head 14 adapted to register with the apertures 36 in the yoke 34 when in this position to receive the pins 24. When thus assembled on tightening the nut 47 the cap body part and the supporting arm body part will be forced into clamping engagement with the column 10. In this manner adjustment of the arm is permitted by working a nut near the column 10 instead of on the outer end of the arm 12. This arrangement is very advantageous when the outer end of the arm 12 is near a wall of a tunnel or some other interfering object. The clamp 13 can be placed on the supporting arm when so constructed as before, as clearly shown in Fig. 6.

In Fig. 7 another form of supporting structure is disclosed as having been made of a plurality of the interchangeable parts, previously described. In this structure there is the supporting column 10 on which there is the supporting arm body part of the arm 12. Within this body part there is the yoke 19, rod 28, and on the outer end there is the tightening nut 30. A second supporting arm body part indicated by the reference character 49 is placed in opposition to the first mentioned arm body part taking the place of the cap 20. The pins 24 are positioned through the apertures 48 formed in this arm body part connecting it to the yoke 19. On tightening the nut 30 both of these arms will be caused to clampingly engage the column 10 and if desired, one or more clamps 13 can be positioned on either or both of the arms and machines mounted thereon. Apertures 50 are formed in the clamp body part 31, corresponding to the apertures 48 so that if desired, the clamp body part 31, without its yoke and tension member can be used as a substitution for the cap 20.

From the above described construction it will be appreciated that a novel form of clamping construction is provided which is completely operable by a single nut. In this manner, by tightening nuts 47 and 30 the complete supporting structure is held in adjusted position and on tightening the third nut 44, the drilling machine is firmly fastened to the supporting structure. By virtue of the fact that the parts of the clamp and of the arm are interchangeable, various forms of supporting structures may be set up. Furthermore it is not essential in these various forms that the tightening arrangement be located in all instances at the outer end of the longer body part, enabling the structure to be set up conveniently in inconvenient locations. Also by virtue of the fact that the parts are interchangeable it is not necessary to keep a large number of variously sized and properly fitting parts on hand to set up the various forms of supporting structures.

It will be understood that when the various parts are re-assembled to form various supporting structures that parts which have been above described as constituting body parts, serve as cap parts, for example, in Fig. 6 the long arm body part serves as a cap part for the clamp body part used in this set-up, likewise in Fig. 7 the arm body part 49 serves as a cap part for the arm body part 12.

Various changes may be made in the details of construction without departing from the spirit or scope of the invention as designed by the appended claims.

I claim,

1. A device of the class described comprising a body part adapted to be positioned against a support, a cap part complementary to said body part, a yoke on one of said parts adapted to partially encircle the support, means for detachably connecting the yoke to the other part and means on the part carrying the yoke for drawing the yoke away from the support so as to cause the parts to clamp on the support.

2. A device of the class described comprising a body part adapted to be positioned against a support and formed to partially encircle it, a cap part complementary to said body part, a yoke on one of said parts adapted to partially encircle the support, means for detachably connecting the yoke to the other part, and means operable from the outer end of one of said parts for drawing the yoke away from the support.

3. A device of the class described comprising a body part adapted to be positioned against a support and formed to partially encircle it, a cap part complementary to said body part, a yoke on one of said parts adapted to partially encircle the support, means for detachably connecting the yoke to the other part, a tension member in the part carrying the yoke, and means for causing tension to be applied to the tension member to draw the yoke away from the support to cause the parts to clampingly engage upon the support.

4. A device of the class described comprising a body part adapted to be positioned against a support and formed to partially encircle it, a cap part complementary to said body part, a yoke on one of said parts adapted to partially encircle the support, means for detachably connecting the yoke to the other part, a tension member in the part carrying the yoke, and means operable at the outer end of said tension member for causing tension to be applied thereto to draw the yoke away from the support to cause the parts to clampingly engage upon the support.

5. In a support for rock drills and the like, a supporting part, a body part adapted to be positioned there-against and partially encircle the supporting part, a yoke part disposed partially within the body part and adapted to partially encircle the supporting part, a cap part complementary to the body part, means for detachably connecting the arms of the yoke to the cap part, a bolt connected to the yoke, and a nut on the bolt adapted to be tightened against the body part and cause the body and cap parts to clamp upon the supporting part.

6. In a support for rock drills and the like, a supporting part, a body part adapted to be positioned there-against and partially encircle the supporting part, a yoke part disposed partially within the body part and adapted to partially encircle the supporting part, a cap part complementary to the body part, notched keys for connecting the arms of the yoke to the cap part, and means for causing the yoke to pull the cap part into engagement with the supporting part, said means serving by reaction to force the body part into engagement with the supporting part.

7. In a support for rock drills and the like, a supporting part, a body part adapted to be positioned there-against and partially encircle the supporting part, a yoke part disposed partially within the body part and adapted to partially encircle the supporting part, a cap part complementary to the body part, notched keys for connecting the arms of the yoke to the cap part, and means for causing the yoke to pull the cap part into engagement with the supporting part, said means serving by reaction to force the body part into engagement with the supporting part.

In testimony whereof I have signed my name to this specification.

JOHN PRICCO.